(12) United States Patent
Chow et al.

(10) Patent No.: US 8,719,800 B2
(45) Date of Patent: May 6, 2014

(54) ACCELERATING REPLAYED PROGRAM EXECUTION TO SUPPORT DECOUPLED PROGRAM ANALYSIS

(75) Inventors: James Chow, San Jose, CA (US); Tal Garfinkel, Palo Alto, CA (US); Peter M. Chen, Ann Arbor, MI (US)

(73) Assignee: VMware, Inc., Palo Alto, CA (US)

(*) Notice: Subject to any disclaimer, the term of this patent is extended or adjusted under 35 U.S.C. 154(b) by 1202 days.

(21) Appl. No.: 12/239,691

(22) Filed: Sep. 26, 2008

(65) Prior Publication Data
US 2009/0320011 A1    Dec. 24, 2009

Related U.S. Application Data

(60) Provisional application No. 61/074,236, filed on Jun. 20, 2008.

(51) Int. Cl.
*G06F 9/44* (2006.01)

(52) U.S. Cl.
USPC .......................................................... 717/131

(58) Field of Classification Search
None
See application file for complete search history.

(56) References Cited

U.S. PATENT DOCUMENTS

| | | | |
|---|---|---|---|
| 5,966,537 A | 10/1999 | Ravichandran | |
| 6,543,011 B1 * | 4/2003 | Schumacher et al. | 714/45 |
| 6,795,966 B1 | 9/2004 | Lim et al. | |
| 6,802,054 B2 * | 10/2004 | Faraj | 717/128 |
| 6,832,367 B1 * | 12/2004 | Choi et al. | 717/130 |
| 6,895,582 B1 | 5/2005 | Greve | |
| 7,676,508 B2 * | 3/2010 | Robert | 707/999.204 |
| 7,810,071 B2 * | 10/2010 | Thebes et al. | 717/124 |
| 7,840,940 B2 * | 11/2010 | Vertes | 717/120 |
| 7,844,954 B2 * | 11/2010 | Venkitachalam et al. | 717/130 |
| 7,996,836 B1 | 8/2011 | McCorkendale | |
| 8,578,340 B1 * | 11/2013 | Daudel et al. | 717/129 |
| 2004/0193394 A1 | 9/2004 | Levit-Gurevich et al. | |
| 2004/0199828 A1 * | 10/2004 | Cabezas et al. | 714/39 |
| 2007/0011667 A1 * | 1/2007 | Subbiah et al. | 717/148 |
| 2007/0234325 A1 | 10/2007 | Bobrovsky et al. | |
| 2007/0244937 A1 | 10/2007 | Flynn et al. | |
| 2008/0046699 A1 * | 2/2008 | Pauw et al. | 712/227 |
| 2008/0244535 A1 * | 10/2008 | Nelson et al. | 717/129 |
| 2009/0007111 A1 * | 1/2009 | Nelson et al. | 718/1 |
| 2009/0037885 A1 * | 2/2009 | Edwards et al. | 717/128 |
| 2009/0070761 A1 | 3/2009 | Zhao | |
| 2009/0089879 A1 | 4/2009 | Wang et al. | |
| 2009/0320009 A1 | 12/2009 | Chow et al. | |
| 2009/0320011 A1 | 12/2009 | Chow et al. | |

OTHER PUBLICATIONS

"Execution Replay for Multiprocessor Virtual Machines", Dunlap et al., 2008 ACM 978-1-59593-796-4/08/03, Mar. 5-7, 2008.*
"ReVirt: Enabling Intrusion Analysis through Virtual-Machine Logging and Relay", Dunlap et al., Proceedings of the 2002 Symposium on Operating Systems Design and Implementation (OSDI).*
"Time Travel for Closed Distributed Systems", Burtsev et al., IMC 2004.*

(Continued)

*Primary Examiner* — Don Wong
*Assistant Examiner* — Daxin Wu

(57) ABSTRACT

A virtual machine system decouples dynamic program analysis from program execution. Program analysis is decoupled from program execution through the use of a virtual machine to record program execution and an analysis platform to replay and analyze the program execution. Optimization techniques are applied to prevent the analysis platform from falling too far behind the program execution platform during replay.

20 Claims, 13 Drawing Sheets

(56) References Cited

OTHER PUBLICATIONS

"ReTrace: Collecting Execution Trace with Virtual Machine", Xu et al., In Proceedings of the 3rd Annual Workshop on Modeling, 2007.*

Jim Chow, et al. "Decoupling dynamic program analysis from execution in virtual enviomments." USENIX '08: 2008 USENIX Annual Technical Conference, Jun. 22-27, 2008.

Edmund B. Nightingale, at al., "Parallellizing Security Checks on Commodity Hardware." Proceedings of the 2008 International Conference on Architectural Support for Programming Languages and Operating Systems (ASPLOS), Mar. 2008.

George W. Dunlap, et al., "ReVirt: Enabling Intrusion Analysis through Virtual-Machine Logging and Replay." Proceedings of the 2002 Symposium on Operating Systems Design and Implementation (OSDI), Dec. 2002.

Harish Patil, et al., "Efficient Run-time Monitoring Using Shadow Processing." Proceedings of the International Workshop on Automated and Algorithmic Debugging (AADEBUG), May 1995.

Shimin Chen, et al., "Log-Based Architectures for General-Purpose Monitoring of Deployed Code." 2006 Workshop on Architectural and System Support for Improving Software Dependability (ASID), Oct. 2006.

Steve Herrod, "The Amazing Record/Replay Feature in VMware Workstation 6," VMware: Virtually There blog, Apr. 17, 2007 entry, available at http://blogs.vmware.com/sherrod/2007/04/the_amazing_vm_.html (last visited Sep. 25, 2008).

Burtsev et al., "Time Travel for Closed Distributed Systems", IMC 2004.

* cited by examiner

ACCELERATING REPLAYED PROGRAM EXECUTION TO SUPPORT DECOUPLED PROGRAM ANALYSIS

CROSS-REFERENCE TO RELATED APPLICATIONS

The present application claims the benefit of U.S. provisional patent application Ser. No. 61/074,236, filed on Jun. 20, 2008, and entitled "Decoupling Dynamic Program Analysis From Execution In Virtual Environments," which is hereby incorporated by reference. The present application also incorporates by reference the following: U.S. patent application Ser. No. 12/239,590, entitled "Decoupling Dynamic Program Analysis From Execution In Virtual Environments" and filed on Sep. 26, 2008, U.S. patent application Ser. No. 12/239,648, entitled "Decoupling Dynamic Program Analysis From Execution Across Heterogeneous Systems" and filed on Sep. 26, 2008, and U.S. patent application Ser. No. 12/239,674, entitled "Synchronous Decoupled Program Analysis In Virtual Environments" and filed on Sep. 26, 2008.

BACKGROUND OF THE INVENTION

Dynamic program analysis involves the analysis of a computer program while it is executing in real-time. It may be used for various applications including intrusion detection and prevention, bug discovery and profiling, corruption detection and identifying non-fatal memory leaks.

Dynamic program analysis adds overhead to the execution of the computer program because it is executed "inline" with program execution. It requires dynamic loading of special libraries or recompiling the computer program to insert analysis code into the program's executable code. Some dynamic program analysis (e.g., instrumentation and probing functionality, etc.) can add sufficient overhead to the execution of the program to perturb the processor workload and even cause "heisenbugs," i.e., where the phenomenon under observation is changed or lost due to the measurement itself. For example, dynamic program analysis commonly used for detecting buffer overflow or use of undefined memory routinely incurs overhead on the order of 10-40×, rendering many production workloads unusable. Even in nonproduction settings, such as program development or quality assurance, this overhead may dissuade use in longer more realistic tests. As such, to minimize performance costs, dynamic program analysis tools today perform a minimal set of checks, meaning that many critical software flaws can remain overlooked.

SUMMARY OF THE INVENTION

In one or more embodiments of the invention, dynamic program analysis is decoupled from execution in virtual computer environments so that program analysis can be performed on a running computer program without affecting or perturbing the workload of the system on which the program is executing. Decoupled dynamic program analysis is enabled by separating execution and analysis into two tasks: (1) recording, where system execution is recorded with minimal interference, and (2) analysis, where the execution is replayed and analyzed.

Execution performance of an analysis virtual machine that is performing decoupled dynamic program analysis is optimized so that the analysis does not lag too far behind the program execution. According to one embodiment, a first virtual machine that is running the program being analyzed records a log comprising non-deterministic events in its instruction stream and read data corresponding to read requests from its virtual processor to at least one emulated device. A replay platform, such as a second virtual machine, that is performing the program analysis replays the instruction stream of the first virtual machine using the log recorded by the first virtual machine. By accessing the read data from the log, the second virtual machine does not incur wait times associated with read accesses from an emulated device. In another embodiment, the replay platform disables exception checking so that exceptions can be generated in the replay platform without actually performing the exception check.

DETAILED DESCRIPTION

A. Virtualization Platform Architecture

Figure 1:
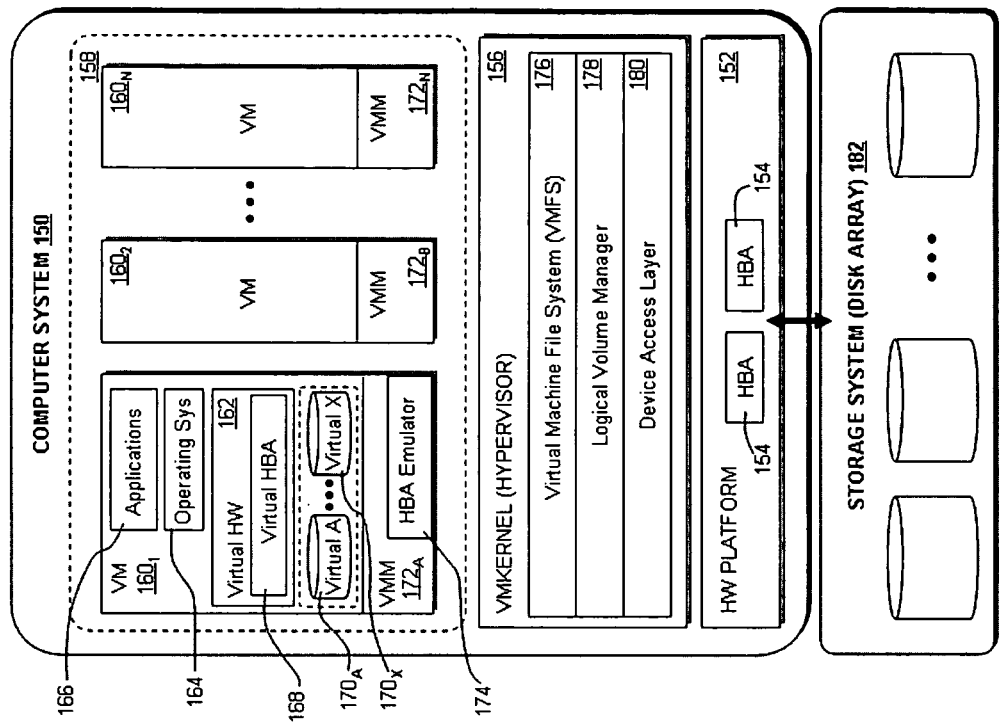
FIG. 1 depicts functional block diagrams of virtualized computer systems in which one or more embodiments of the invention may be practiced.
Figure 1:
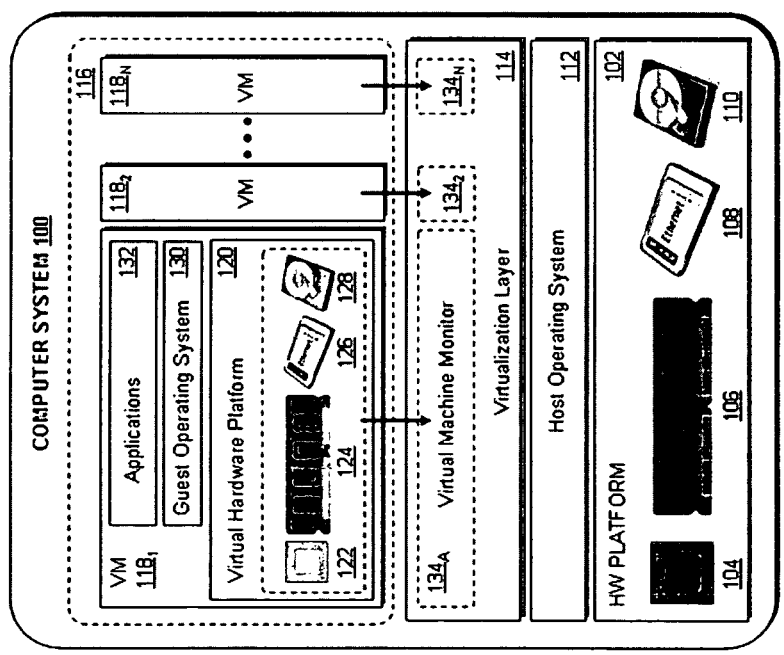

FIG. 1 depicts functional block diagrams of virtualized computer systems in which one or more embodiments of the invention may be practiced. Computer system 100 may be constructed on a typical desktop or laptop hardware platform 102 such as an x86 architecture platform. Such a hardware platform may include CPU 104, RAM 106, network card 108, hard drive 110 and other I/O devices such as a mouse and a keyboard (not shown in FIG. 1). Host operating system 112 such as Microsoft Windows, Linux or NetWare runs on top of hardware platform 102. Virtualization software layer 114 is installed on top of host operating system 112 and provides a virtual machine execution space 116 within which multiple virtual machines (VMs) $118_1$-$118_N$ may be concurrently instantiated and executed. In particular, virtualization layer 114 maps physical resources of hardware platform 102 (e.g., CPU 104, RAM 106, network card 108, hard drive 110, mouse, keyboard, etc.) to "virtual" resources of each virtual machine $118_1$-$118_N$, such that each virtual machine $118_1$-$118_N$ has its own virtual hardware platform 120 with its own emulated CPU 122, RAM 124, network card 126, hard drive 128 and other emulated I/O devices. For example, virtual hardware platform 120 may function as the equivalent of a standard x86 hardware architecture such that any x86 supported operating system such as Microsoft Windows, Linux, Solaris x86, NetWare, FreeBSD, etc. may be installed as guest operating system 130 to execute applications 132 for an instantiated virtual machine such as $118_1$. As part of virtualization layer 114, virtual machine monitors (VMM) $134_A$-$134_N$ implement virtual system support needed to coordinate operation between host operating system 112 and its corresponding virtual machines $118_1$-$118_N$. An example of software implementing virtualization layer 114 for a desktop or laptop hardware platform 102 is VMware Workstation 6™ which is available from VMware™ Inc. of Palo Alto, Calif.

Computer system 150 is an alternative system in which one or more embodiments of the invention may be practiced. Computer system 150 may be constructed on a conventional server-class, hardware platform 152 including host bus adapters (HBA) 154 in addition to conventional platform processor, memory, and other standard peripheral components (not separately shown). Hardware platform 152 may be coupled to an enterprise-class storage system 182. Examples of storage systems 182 may be a network attached storage (NAS) device, storage area network (SAN) arrays, or any other similar disk arrays. It should also be recognized that enterprise-level implementations of the foregoing may have multiple computer systems similar to computer system 150 that may be connected through various different known topologies and technologies (e.g., switches, etc.) to multiple storage systems 182. A virtualization software layer (also sometimes referred to as a hypervisor) such as, for example, VMware's VMkernel™ 156 in its server-grade VMware ESX™ product, is installed on top of hardware platform 152 and supports a virtual machine execution space 158 within which multiple VMs $160_1$-$160_N$ may be concurrently instantiated and executed. Each such virtual machine $160_1$-$160_N$ implements a virtual hardware (HW) platform 162 that supports the installation of a guest operating system 164 which is capable of executing applications 166. Similar to guest operating system 130, examples of guest operating system 164 may be Microsoft Windows, Linux, Solaris x86, NetWare, FreeBSD or any other supported operating system. In each instance, guest operating system 164 includes a native file system layer (not shown), for example, either an NTFS or an ext3 type file system layer. These file system layers interface with virtual hardware platform 162 to access, from the perspective of guest operating systems 164, a data storage HBA, which in reality, is virtual HBA 168 implemented by virtual hardware platform 162 that provides the appearance of disk storage support (i.e., virtual disks $170_A$-$170_X$) to enable execution of guest operating system 164 transparent to the virtualization of the system hardware.

Although, from the perspective of guest operating systems 164, file system calls to initiate file system-related data transfer and control operations appear to be routed to virtual disks $170_A$-$170_X$, in reality, such calls are processed and passed through virtual HBA 168 to adjunct virtualization software layers (for example, VMM layers $172_A$-$172_N$) that implement the virtual system support needed to coordinate operation with VMkernel 156. In particular, host bus emulator 174 functionally enables guest operating system file system calls to be correctly handled by VMkernel 156 which passes such operations through to true HBAs 154 that connect to storage system 182. For example, VMkernel 156 receives file system calls from VMM layers $172_A$-$172_N$, and converts them into file system operations that are understood by virtual machine file system (VMFS) 176 which in general, manages creation, use, and deletion of files stored on storage system 182. VMFS 176, in turn, converts the file system operations to volume block operations, and provides the volume block operations to logical volume manager (LVM) 178, which supports volume oriented virtualization and management of the disk volumes in storage system 182. LVM 178 converts the volume block operations into raw disk operations for transmission to device access layer 180. Device access layer 180, including device drivers (not shown), applies command queuing and scheduling policies to raw disk operations and sends them to HBAs 154 for delivery to storage system 182.

B. Deterministic VM Record and Replay Functionality

Figure 2:
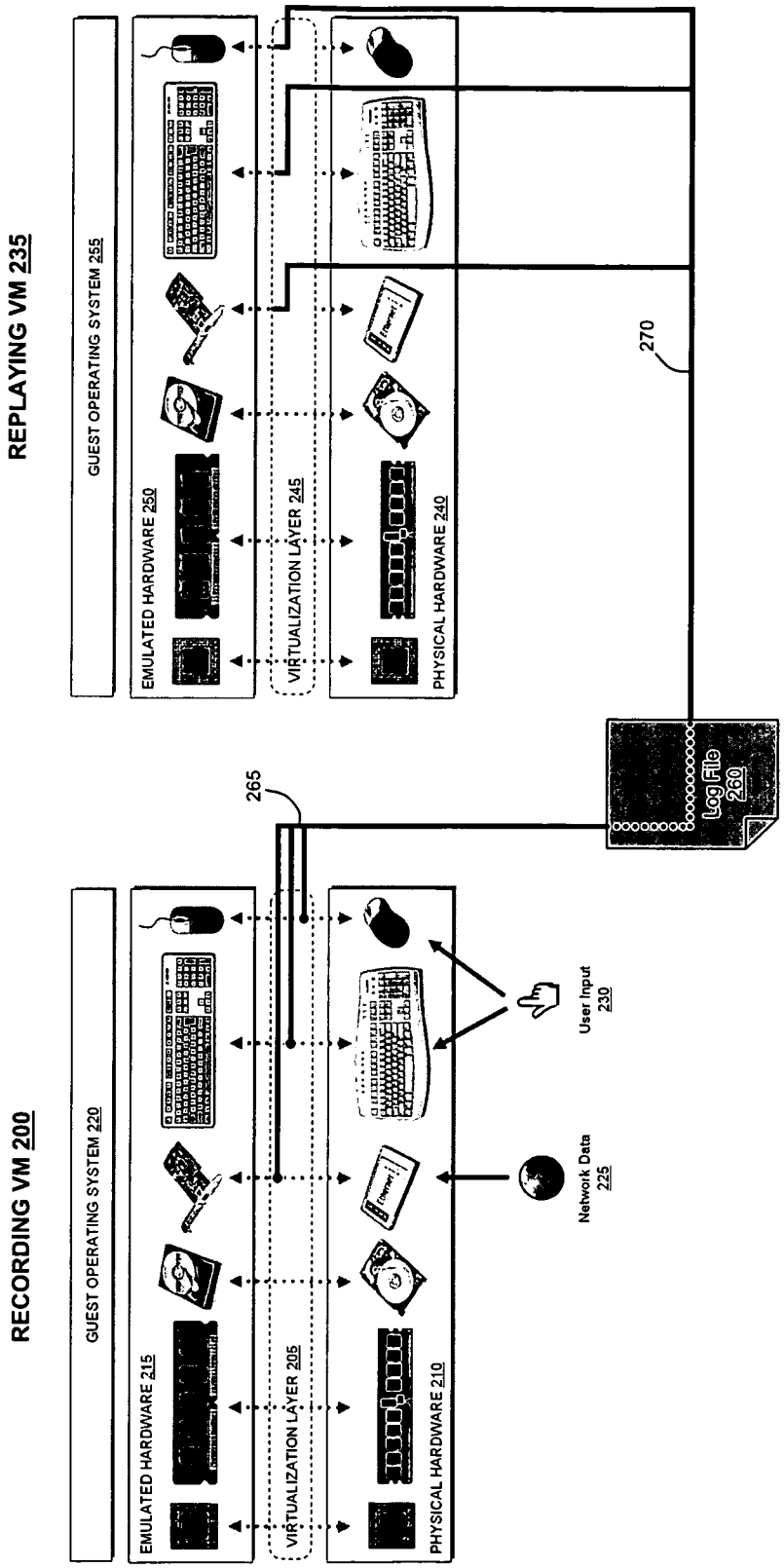
FIG. 2 is a block diagram depicting one embodiment of a homogeneous record and replay platform.

One or more embodiments of the invention leverage the capability of certain virtual machine platforms to record and subsequently replay execution behavior of virtual machines. An example of a virtual machine with such record and replay features in which embodiments of the invention can be implemented is VMware Workstation 6 which is available from VMware Inc. of Palo Alto, Calif. To support replay, inputs to the CPU that are not included in the state of the guest operating system memory, registers or disk are supplied to the CPU of the replaying virtual machine. As depicted in FIG. 2, in one embodiment, VM 200 (the "recording VM") records information corresponding to non-deterministic events that occur within its instruction stream in log file 260. Examples of such non-deterministic events include reads from external devices (e.g., network, keyboard or timer, etc.) (see, e.g., 225 and 230) and virtual machine interrupts (e.g., an indication after a data read instruction that DMA transfer from disk has been completed and is ready to be read, etc.). VM 235 (the "replaying VM") replaying the instruction stream of recording VM 200 consumes the recorded information in log file 260. Recording VM 200 and replaying VM 235 are instantiated from the same type of virtualization layer 205 and 245 (although they may be hosted on different hardware platforms 210 and 240) and share the same types of emulated resources and devices (see 215 and 250). Given a particular input to a particular emulated resource or device, both recording VM 200 and replaying VM 235 will deterministically output the same result. As such, non-deterministic inputs into emulated devices 215 (e.g., network data and user input) of recording VM 200 are recorded (as indicated by line 265) into log file 260 so they can be delivered (as indicated by line 270) to the corresponding emulated devices 250 of replaying VM 235. If recording VM 200 and replaying VM 235 begin from the same initial VM state (e.g., same guest operating systems, see 220 and 255, memory, registers, disk, etc.) and replaying VM 235 knows when to insert the next non-deterministic event occurring in the instruction stream of recording VM 200, then replaying VM 235 will accurately recreate the instruction stream of recording VM 200.

Figure 3:
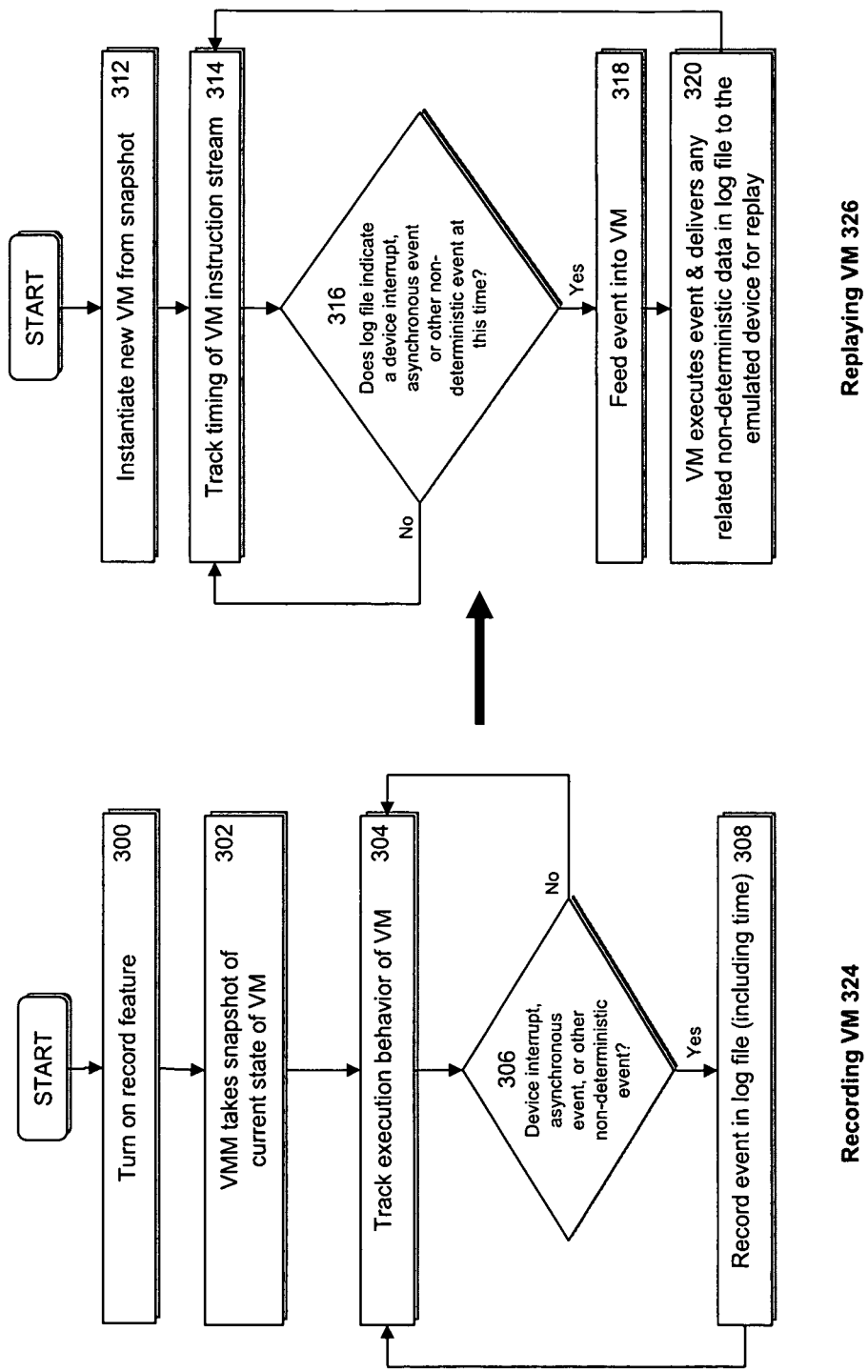
FIG. 3 is a flow chart depicting an embodiment of a method for recording and replaying execution behavior on a homogeneous record and replay platform.

A record and replay functionality, as implemented in one or more embodiments of the invention, is depicted in the flowchart of FIG. 3. First, the VMM of recording VM 324 enables the recording feature (step 300), takes a snapshot of the VM state (e.g., guest memory, registers, disks, etc.) (step 302), and begins tracking system behavior (including CPU and device activity) as recording VM 324 executes (step 304). When non-deterministic events such as device interrupts or other asynchronous events occur (step 306), information relating to such events is recorded in a log file (step 308). Such information includes timing (e.g., placement within the instruction stream, such as the $n^{th}$ instruction in the stream) of the occurrence so that replaying VM 326 can execute the event at the same time within its own instruction stream. For example, the timing of a virtual machine interrupt indicating that DMA transfer from an emulated hard drive has been completed may be recorded in the log file. However, the data value of the DMA transfer itself may not necessarily be recorded because the same type of hard drive is emulated on both recording VM 324 and replaying VM 326 such that the emulated hard drive of replaying VM 326 can deterministically output the correct data upon replaying the interrupt at the right time. For other non-deterministic events, additional data may be recorded in addition to timing information. For example, for emulated devices that support external inputs such as a keyboard, mouse, or network card, data values such as user key press, mouse movement and clicks, network data, etc. are recorded in the log file in addition to timing information since the corresponding emulated devices of replaying VM 326 cannot deterministically recreate such external inputs. Similarly, reads of a timer of recording VM 326 may also record the value of the timer since such a value cannot be deterministically obtained from the timer of replaying VM 326. After such events are recorded in step 308, the flow then returns to step 304.

Replaying VM 326 is instantiated from the snapshot taken in step 302 (step 312) and replaying VM 326 tracks the timing of the execution of its instruction stream in step 314. If the log file recorded by recording VM 324 indicates the occurrence of a non-deterministic event (step 316), the VMM of replay VM 326 feeds the non-deterministic event into the instruction stream of replay VM 326 at the same point in time that it occurred during the original execution (step 318). Replaying VM 326 executes the event, for example, by timely delivering external input data recorded in the log file such as key presses, mouse movements and network data to the appropriate emulated devices (e.g., keyboard, mouse, network card, etc.) to be deterministically replayed by such devices or by timely inserting interrupts into the CPU instruction stream to retrieve outputs deterministically made available by emulated devices (e.g., hard drive data output responses after CPU read requests) (step 320). The flow then returns to step 314 to handle subsequent non-deterministic events in the log file, if any.

Figure 4:
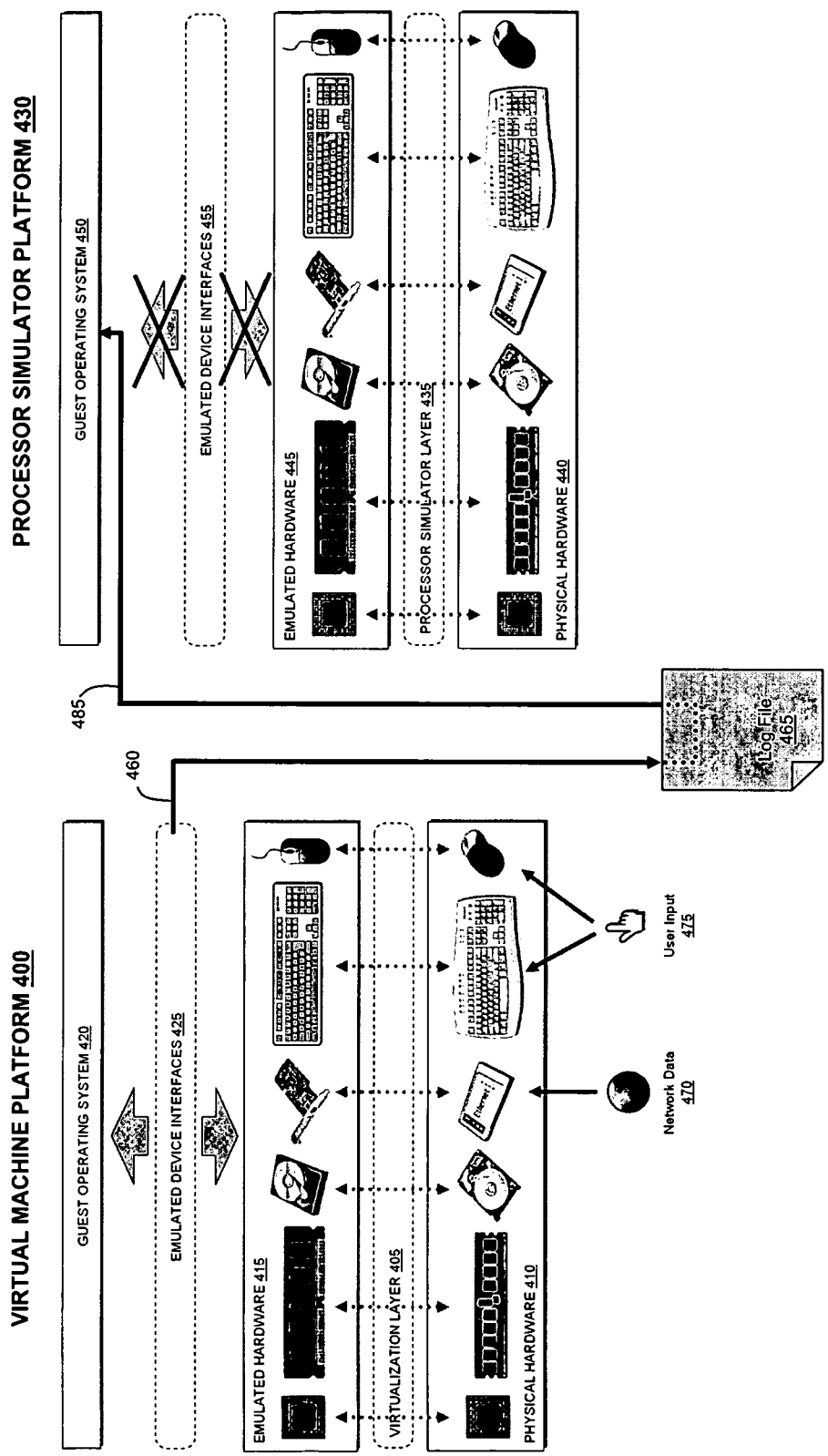
FIG. 4 is a block diagram depicting one embodiment of a heterogenous record and replay platform.

FIG. 4 is a block diagram depicting one embodiment of a "heterogenous" record and replay platform. In this embodiment, the execution behavior of a workload is recorded on one platform, such as virtual machine platform 400, and then replayed on a different (i.e., heterogeneous) platform that does not share the same types of emulated devices as the first platform, such as processor simulator 430. An example of processor simulator 430 in which embodiments of the invention can be implemented is the open source x86 simulator QEMU. Similar to the virtual machine platforms of FIG. 1, recording virtual machine platform 400 has a virtualization layer 405 that maps physical hardware 410 of the actual computer system to emulated hardware 415 (which may be different from the physical hardware) that is exposed to guest operating system 420. Guest operating system 420 and emulated hardware 415 interact with each other through emulated hardware interfaces 425 (e.g., hardware port accesses, memory mapped I/O, etc.) which format requests to and responses from the emulated devices into data packages specific for such emulated devices. Similarly, replaying processor simulator platform 430 has processor simulator layer 435 that maps physical hardware 440 of its computer system to its emulated hardware 445 (which are different from emulated hardware 415 of virtual machine platform 400) that is exposed to guest operating system 450 (i.e., the same operating system as guest operating system 420) through emulated hardware interface 455.

Because processor simulator platform 430 does not emulate the same hardware as virtual machine platform 400, instructions from the instruction stream of virtual machine platform 400 that involve requests made to emulated devices 415 (e.g., reads of the hard drive, etc.) cannot be deterministically replayed by a corresponding emulated device as in the embodiment of FIG. 3. As such, instead of recording the non-deterministic external inputs to emulated devices, virtual machine platform 400 records (as indicated by line 460) in log file 465 the outputs from emulated devices 415 to the CPU as well as the corresponding specific emulated device data formatting information (e.g., data formatting packet structures, etc.) from emulated device interface 425, in addition to timing information. In turn, replaying processor simulator 430 is modified so that the device data outputs and formatting are consumed directly from log file 465 rather than from emulated device layer 445 (as indicated by line 485).

Figure 5:
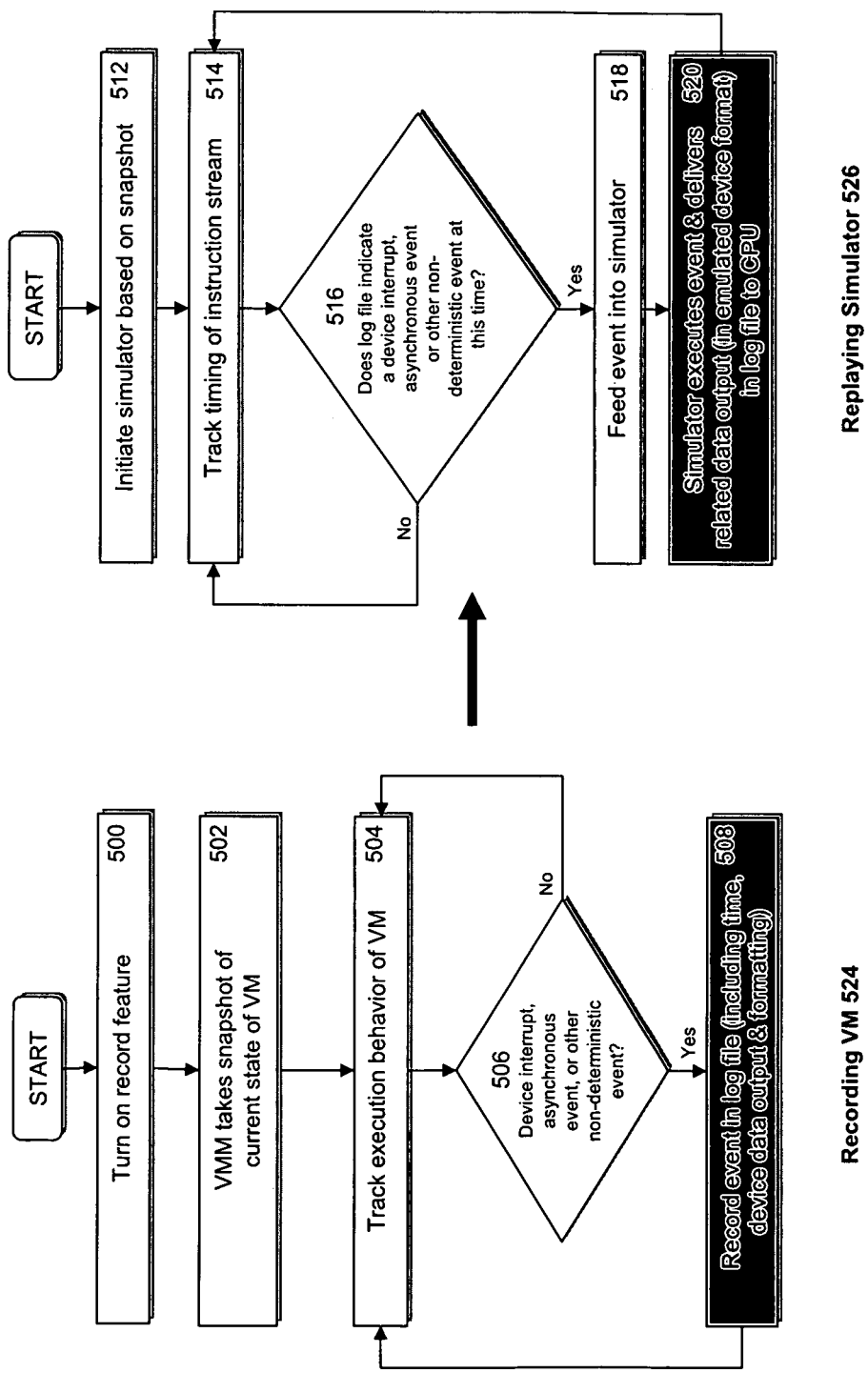
FIG. 5 is a flow chart depicting an embodiment of a method for recording and replaying execution behavior on a heterogeneous record and replay platform.

A flowchart depicting record and replay between the heterogeneous platforms of FIG. 4 is depicted in FIG. 5. First, the VMM of recording VM 524 enables the record feature (step 500), takes a snapshot of the VM state (e.g., guest memory, registers, disks, etc.) (step 502), and begins tracking system behavior (including CPU and device activity) as recording VM 524 executes (step 504). When non-deterministic events such as device interrupts or other asynchronous events occur (step 506), information relating to such events is recorded in a log file (step 508). Such information includes the timing (e.g., placement within the instruction stream) of the occurrence and device data outputs to the CPU (as specifically formatted by the emulated devices of recording VM 524) so that replaying simulator 526 can execute the event at the same place within its own instruction stream and simulate any data outputs from the emulated device associated with recording VM 524 by transmitting to the simulated processor system the data output recorded in the log file (in the format that would have been transmitted by the emulated device). Unlike step 320 in FIG. 3, the recording of external inputs to emulated devices such as user key presses, mouse movements and clicks, network data, etc. are not necessary in the embodiment of FIG. 5 because the data outputs of these emulated devices that are recorded in the log file already capture such information. After recording such events, the flow then returns to step 504.

Replaying simulator 526 is instantiated based upon information in the snapshot taken in step 502 (step 512) and tracks the timing of the execution of its instruction stream in step 514. If the log file recorded by recording VM 524 indicates the occurrence of a non-deterministic event (step 516), replaying simulator 526 feeds the non-deterministic event into its instruction stream at the same point in time that it occurred during the original execution of recording VM 524 (step 518). Processor simulator 526 executes the event, for example, by timely delivering any related device data output (in the proper emulated device format) in the log file for access by the emulated CPU of processor simulator 526 (step 520). The flow then returns to step 514.

It should be recognized that variations on the heterogeneity of the recording and replaying platforms may be implemented in an embodiment without departing from the spirit of the invention. For example, rather than a replaying simulator as in FIGS. 4 and 5, a different virtual machine platform supporting different emulated devices may be used to replay the recording VM's execution behavior.

C. Decoupling Analysis From Workload

Figure 6:
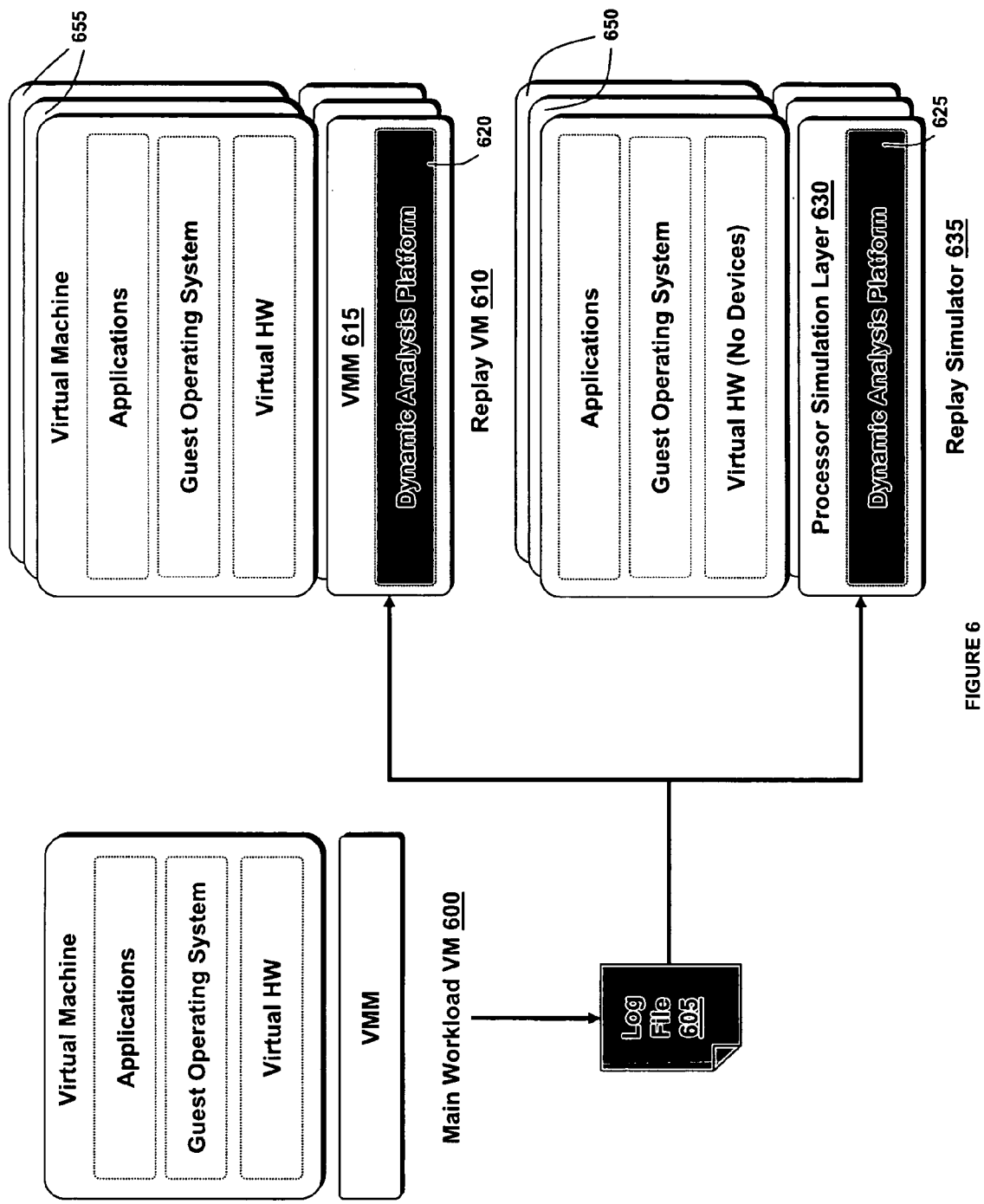
FIG. 6 is a schematic diagram of dynamic analysis platforms according to one or more embodiments of the invention.

FIG. 6 is a schematic diagram of dynamic analysis platforms according to one or more embodiments of the invention. Dynamic program analysis is performed by decoupling analysis from a main workload while providing the analysis with the identical and complete sequence of states from the main workload as if they were not decoupled. Such decoupling allows the analysis to be added to a running system without fear of breaking the main workload. Furthermore, because the analysis is run on a separate system from the main workload, new analyses can be carried out without changing the running applications, operating system or VMM of the main workload.

In one embodiment, a record feature is enabled on a VM running main workload 600, thereby creating replay log 605 that is fed into a different instantiated VM 610 that has been loaded with an initial recorded snapshot of main workload VM 600. VMM 615 of replay VM 610 includes dynamic program analysis platform 620 that is executed during replay. A similar decoupled dynamic program analysis platform 625 can be built in simulation layer 630 of a replaying heterogeneous platform such as replay simulator 635. In these systems, when analysis code is executed, the order of recorded and replayed instructions streams are not affected because dynamic program analysis platform 620 or 625 is implemented at the level of VMM 615 or simulation layer 630, which are able to programmatically ignore or otherwise remove instructions relating to the analysis code when generating the virtual machine or simulated processor instruction streams.

The decoupling of analysis from the main workload as described herein further enables embodiments to scale and run multiple analyses as depicted in 650 and 655 for the same workload. In one embodiment, the decoupled analyses are run in parallel with the main workload. In another embodiment, the decoupled analyses are run in parallel with each other. Without decoupling, running multiple analyses would require separate execution runs per analysis and would therefore suffer from the likelihood of divergent runs and inconsistent analyses. Furthermore, decoupling enables optimization techniques to be separately applied to main workload VM 600 and the analysis platforms (e.g., 610 and 635). For example, main workload VM 600 can be optimized for real-time performance and responsiveness while the analysis platforms (e.g., 610 and 635) can be separately optimized for ease of instrumentation during analysis.

It should be recognized that dynamic analysis may be implemented in VMM layer 615 or simulation layer 630 of a replay system in a variety of ways. For example, in one embodiment, ad-hoc hooks that supply callbacks when events of interest happen may be built into the replaying environment OS. Similarly, dynamic analysis may be implemented through dynamic binary translation (BT), which dynamically translates a set of instructions into an alternative set of instructions on the fly, when are then executed. Performing dynamic analysis at the level of VMM 615 or simulation layer 630 provides visibility at all layers of the software stack, thereby enabling embodiments to analyze operating systems, applications, and interactions across components. For example, any individual process running in guest operating system as well as the guest OS kernel itself can be a target of analysis.

It should be recognized that decoupling analysis according to one or more embodiments of the invention may treat the timing of the analysis/replay system differently to achieve certain results in performance and safety. For example, for situations where timely analysis results are critical, such as intrusion detection and prevention, the analysis/replay system may be executed in parallel with the main workload VM, with the output of the workload synchronized with the analysis. For situations that can tolerate some lag between analysis and workload, the analysis/replay system may be run in parallel with the workload, but with no synchronization between the output of the workload and analysis. For situations where analyses are not known beforehand or are not time critical, such as debugging, the analysis/replay system can be run offline. For example, system administrators can use intensive checks for data consistency, taint propagation, and virus scanning on their production systems. Developers can run intensive analyses for memory safety and invariant checking as part of their normal debugging, or as additional offline checks that augment testing that must already be performed in a quality-assurance department. Computer architects can capture the execution of a production system with little overhead, then analyze the captured instruction stream on a timing-accurate, circuit-level simulator. Because decoupling can be done offline, analysis that was not foreseen during the original run can be performed with users iteratively developing and running new analysis on the original execution behavior of the main workload VM.

D. Improving Heterogeneous Replay

As previously discussed in the context of FIGS. 4 and 5, heterogeneous record and replay systems require the recording VM to monitor and record more information into the replay log file than systems that utilize the same virtual machine platform (i.e., "homogeneous" systems), such as the systems of FIGS. 2 and 3. For example, the heterogeneous record and replay systems of FIGS. 4 and 5 record the data outputs from emulated devices to the CPU, corresponding emulated device data formatting information (e.g., data formatting packet structures, etc.) from emulated device interface 425 and timing information into the log file while the homogenous record and replay embodiment of FIGS. 2 and 3 record only the timing of non-deterministic events and external inputs to emulated devices. The increased level of recording in heterogeneous systems can affect the overall execution behavior of the main workload in the recording VM, for example, by slowing it down.

Figure 7:
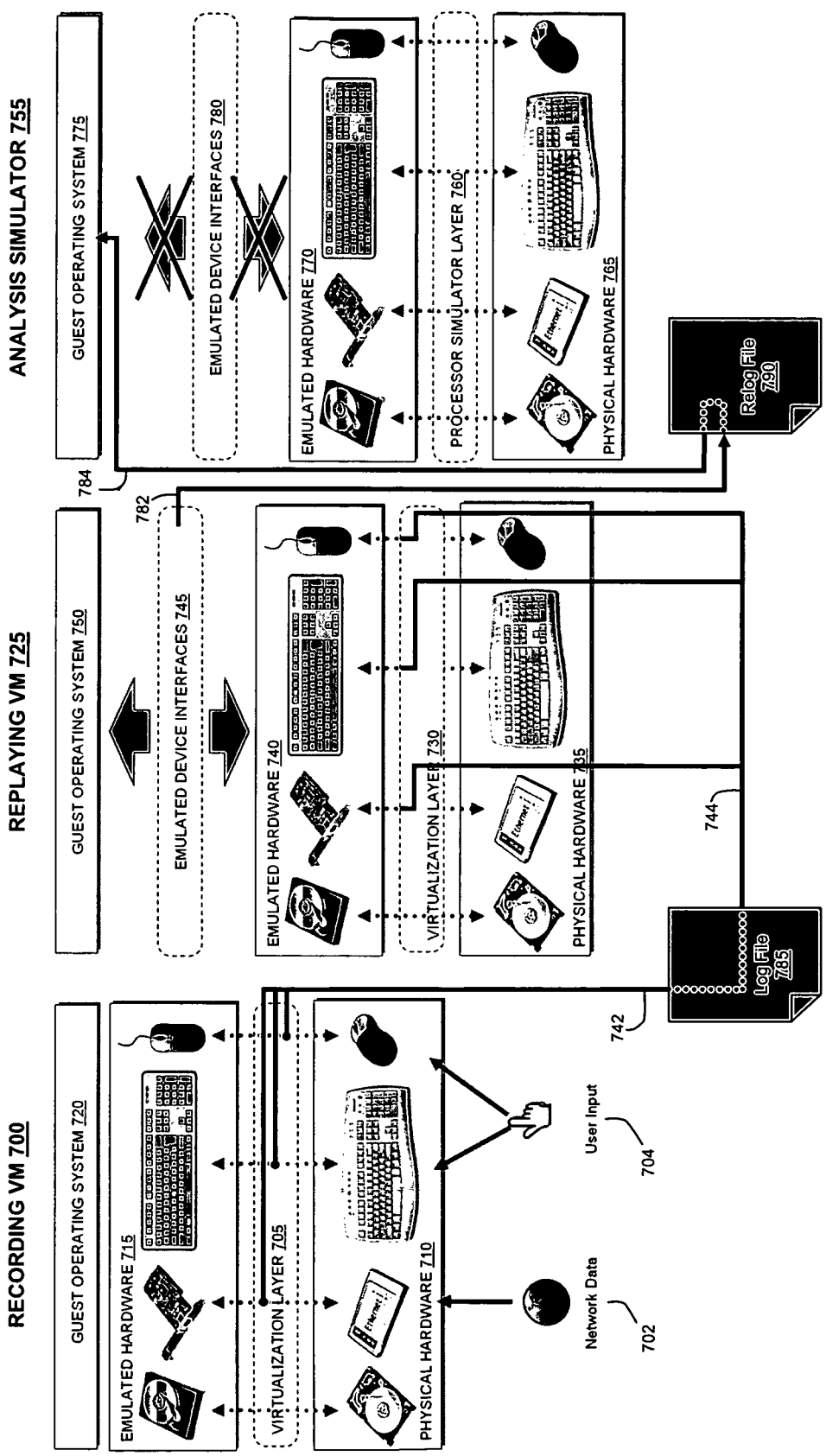
FIG. 7 is a block diagram depicting one embodiment of a heterogeneous record and replay platform using a relog file to improve performance.

FIG. 7 is a block diagram depicting one embodiment of a heterogeneous record and replay platform using a relog file to improve performance. An intermediary homogeneous replay VM 725 is placed in between main workload recording VM 700 and heterogeneous replay and analysis simulator 755 to reduce the level of recording responsibilities on main workload recording VM 700. Similar to recording VM 200 in FIG. 2, recording VM 700 assumes that a virtual machine instantiated on the same virtual machine platform replays its log file 785. External inputs to physical devices 710 such as incoming network data 702 and user interaction with a keyboard and mouse 704 are mapped by virtualization layer 705 into external inputs to corresponding emulated devices 715. The timing and values of these external inputs are recorded into log file 785 (as indicated by line 742), in addition to timing for other non deterministic events such as interrupts.

To replay the execution behavior of recording VM 700, replaying VM 725 consumes the recorded information in log file 785. In particular, virtualization layer 730 delivers the external input values and related timing information in log file 785 (as indicated by line 744) to corresponding emulated devices 740 of replaying VM 725 (i.e., any external inputs to physical layer 735 of replaying VM 725 are ignored during a replay session). Corresponding emulated devices 740 of replaying VM 725 are thus able to deterministically replay the receiving of external inputs and format the data inputs into a data package understandable by guest operating system 750 through emulated device interface 745. To support heterogeneous replay, virtualization layer 730 further records the data format packet structures supported by emulated device interface 745 as well as the data values themselves and timing information (i.e., timing of the device interrupts) into relog file 790 (as indicated by line 782).

Analysis platform 755 of FIG. 7 is a processor simulator that does not share the same emulated devices as recording VM 700 and replaying VM 725. For example, while recording VM 700 and replaying VM 725 are each virtual machines running the same type of guest operating system 720 and 750 (such as Microsoft Windows) on top of emulated x86 virtual platforms 705 and 730 (such as VMware Workstation 6) with the same emulated devices 715 and 740 running on top of Microsoft Windows as their hosted operating systems (not shown) on top of an actual x86 architecture platform 710 and 735, analysis simulator 755 is implemented on an AMD hardware platform 765 running Linux as its hosted operating system (not shown) with the open source emulator QEMU as simulator layer 760 running on top of Linux with a set of emulated devices 770 that are different from emulated devices 715 and 740. Guest operating system 775 running on top of simulator layer 760 in such an embodiment would also be Microsoft Windows to replay the execution behavior of recording VM 700. To replay the execution behavior of recording VM 700, simulator layer 760 consumes the information in relog file 790 to recreate the instruction stream of recording VM 700. In one embodiment, simulator layer 760 is modified (e.g., a modified QEMU) such that its original emulated device interfaces 780 are removed or otherwise supplanted by the delivery of device outputs recorded in the proper emulated device format to the simulated processor (and ultimately to be acted upon by guest operating system 775) through relog file 790 represented by arrow 784.

Figure 8A:
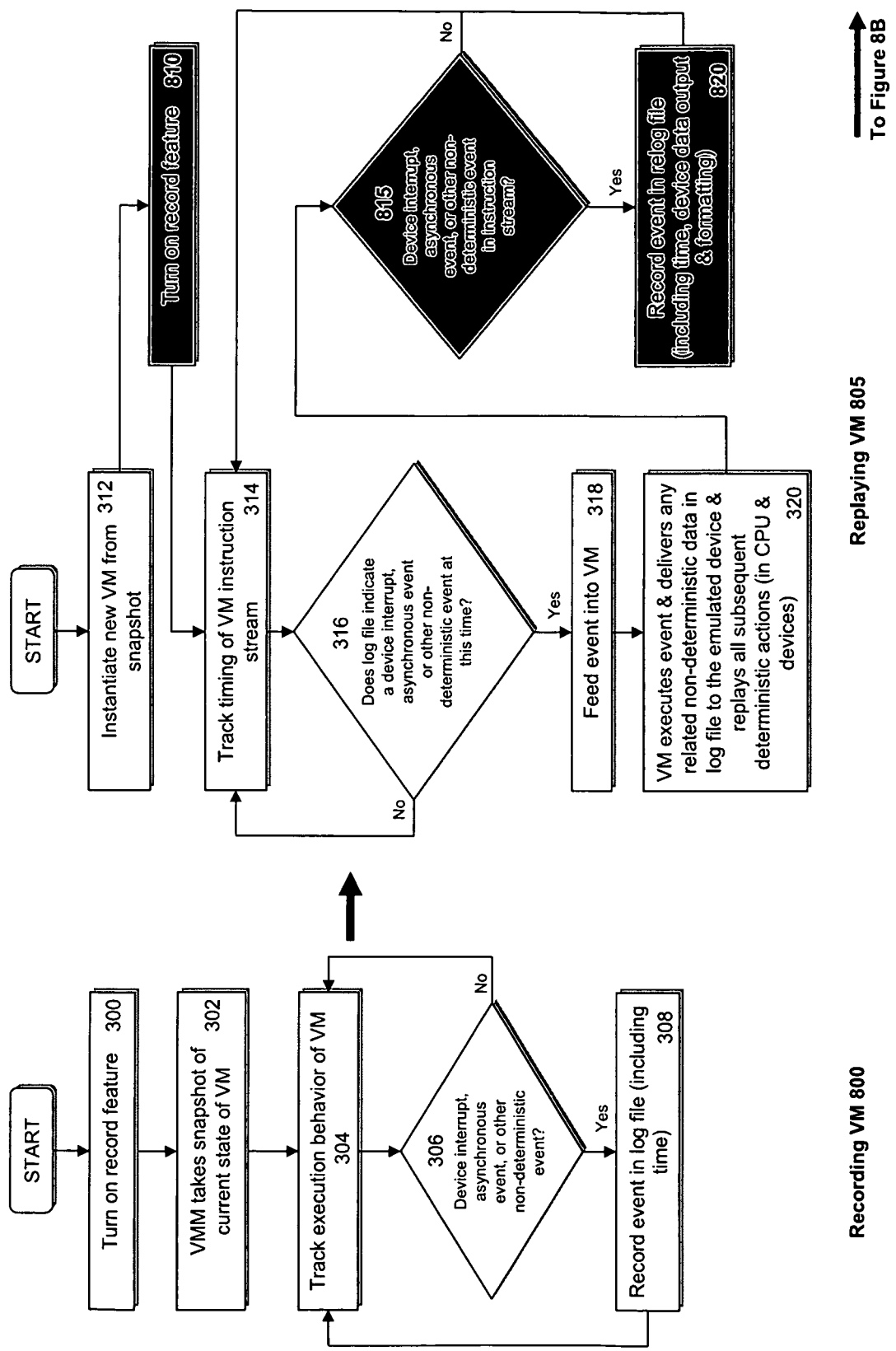
FIGS. 8A and 8B are flow charts depicting an embodiment of a method for recording and replaying execution behavior on a heterogeneous record and replay platform using a relog file to improve performance.
Figure 8B:
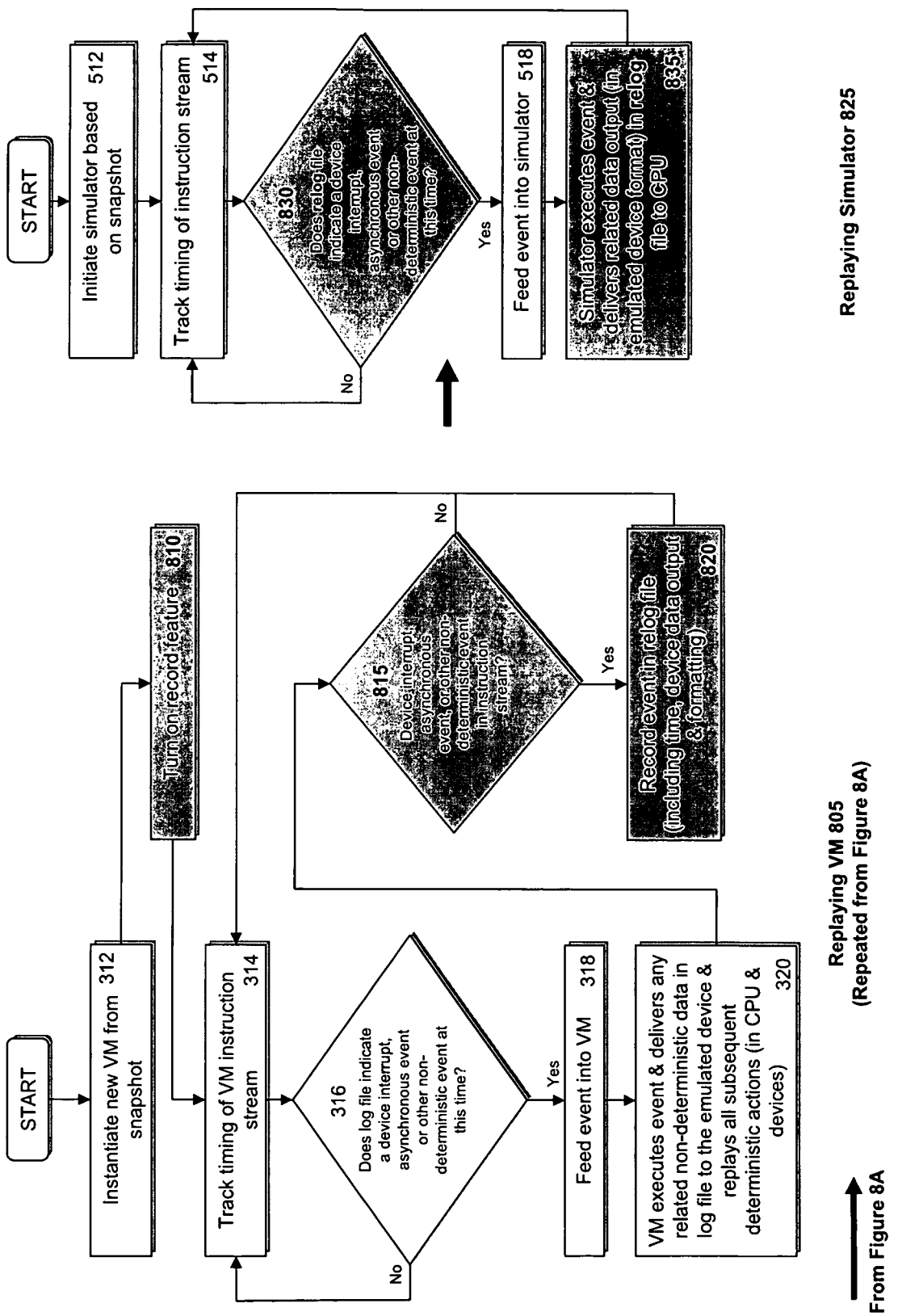

FIGS. 8A and 8B are flow charts depicting an embodiment of a method for recording and replaying execution behavior on a heterogeneous record and replay platform using a relog file to improve performance. Recording VM 800 executes and records the main workload of the system and consumes the same amount of computing resources as recording VM 324 of FIG. 3 to provide a recording log file (steps 300 to 308 in FIG. 8) for replaying VM 805 that is instantiated from the same virtual platform as recording VM 800 and that has the same emulated devices as recording VM 800.

Replaying VM 805 can be thought of as a combination of replaying VM 326 of FIG. 3 and recording VM 524 of FIG. 5. In particular, replaying VM 805 consumes the contents of the log file created by recording VM 800 to recreate the execution behavior of recording VM 800 in a similar manner as replaying VM 326 of FIG. 3 (see steps 312 to 320 in FIG. 8) but additionally has recording steps similar to recording VM 524 to further support replay on a heterogeneous platform. In particular, the VMM of replaying VM 805 turns on the recording feature in step 810 (analogous to step 500 of FIG. 5) and subsequently monitors the execution behavior for non-deterministic events such as device interrupts in step 815 (analogous to step 506 of FIG. 5) which have been inserted into the instruction stream in step 320 through the log file created by recording VM 800. Similar to step 508 of FIG. 5, upon the occurrence of such non-deterministic events within the instruction stream, in step 820, the VMM records the timing (e.g., placement within the instruction stream) of the occurrence and device data outputs to the CPU (as specifically formatted by the emulated devices of replaying VM 805, which are the same types of emulated devices of recording VM 800) into a second "relog" file such as 790 of FIG. 7 so that replaying simulator 825 can execute the event at the same place within its own instruction stream and simulate any data outputs from replaying VM's 805 associated emulated device by transmitting to the simulated processor system the data output recorded in the relog file (in the format that would have been transmitted by the emulated device).

To replay the recording, replaying simulator 825 may be created based upon information in the snapshot taken in step 300 (step 512 in FIG. 8). By tracking the timing of the execution of its instruction stream in step 514 (in FIG. 8), replay simulator 825 delivers the non-deterministic events recorded in the relog file (step 830) into the instruction stream of replay simulator 825 at the same point in time (i.e., within the instruction stream of recording VM 800) that they occurred during the original execution (step 518 in FIG. 8). Replaying simulator 825 thereby recreates recording the instruction stream of recording VM's 800 by executing the event and delivering any related device data output (in the proper emulated device format) in the relog file to the CPU (step 835). The flow then returns to step 514.

It should be recognized that the particular embodiments of FIGS. 7, 8A and 8B are merely exemplary and that variations in certain flows or components may be made without departing from the spirit of the invention. For example, while FIGS. 7, 8A and 8B (as well as the previous figures) depict embodiments having log and relog files stored persistently on disk, it should be recognized that the non-deterministic event information of such files may also be stored and consumed at the RAM level or through a shared cache between the record and replay platforms without necessarily storing such files in persistent storage (e.g., analysis can take place by reading the log over the network without saving to disk).

E. Synchronizing Analysis and Workload

In certain embodiments, the decoupled analysis system runs in a synchronized fashion with the main workload. In one example, the decoupled analysis system executes analysis relating to security checks and upon identifying an intrusion, halts the main workload. In such embodiments, a feedback channel is used to provide communication between the main workload and the decoupled analysis system.

Figure 9A:
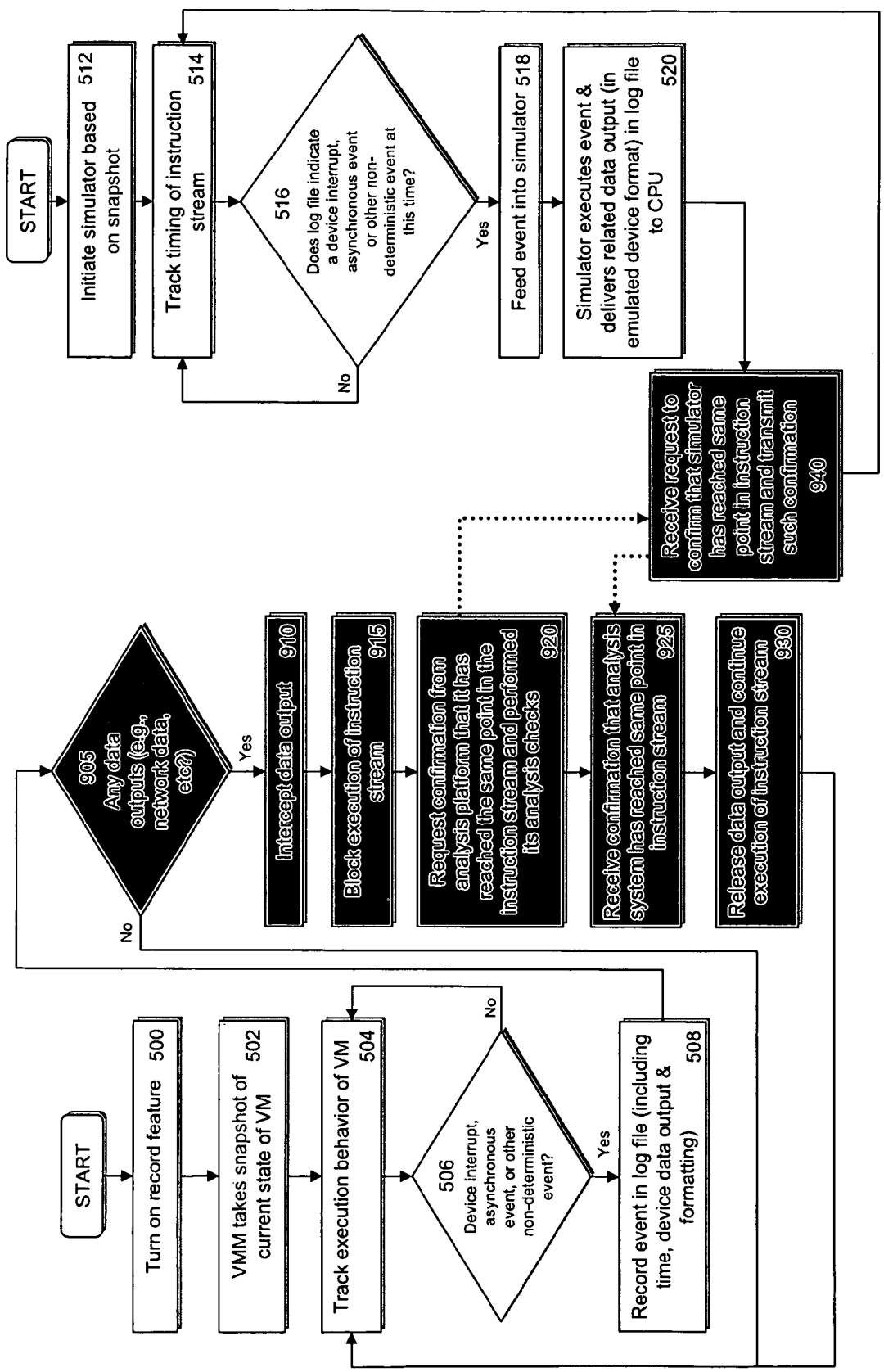
FIG. 9A is a flow chart of an embodiment of a method for synchronizing a record and replay platform.
Figure 9B:
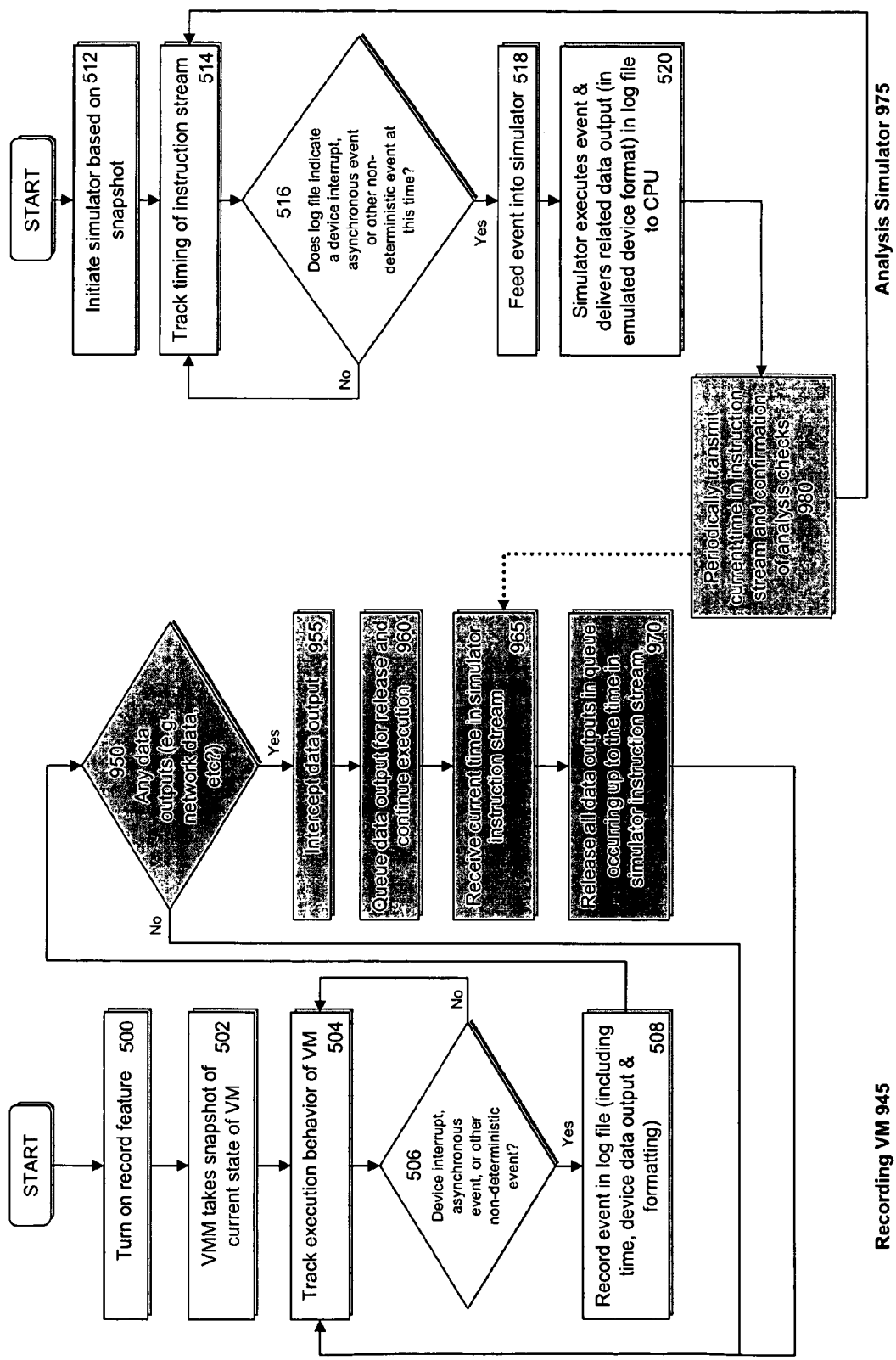
FIG. 9B is a flow chart of an embodiment of another method for synchronizing a record and replay platform.

FIGS. 9A and 9B are flowcharts of embodiments of methods for synchronizing a main workload recording VM and a heterogeneous replay analysis simulator. It should be recognized that the same techniques may be used in an homogeneous embodiment using record and replay VMs, similar to FIG. 3. In the embodiment of FIG. 9A, main workload VM 900 performs the same recording and logging features as recording VM 524 (see steps 500 to 508). However, whenever main workload VM 900 generates data outputs (e.g., data to be output to the network, etc.) (step 905), the VMM intercepts such data output (step 910) and blocks the execution of main workload VM 900 (step 915). In FIG. 9A, main workload VM 900 requests a confirmation from replay analysis simulator 935 that it has reached the same point in its replay of the instruction stream of main workload VM 900 and has completed its analytics (e.g., for a intrusion detection embodiment, it has found no intrusions) (step 920). When replay analysis simulator 935 receives such a request and has reached such a point, it will transmit a confirmation to main workload VM 900 (step 940). When main workload VM 900 receives such a confirmation (step 925), it then releases the data output (e.g., to the network) (step 930). It should be recognized that slight variations in the flow of FIG. 9A do not detract from the scope or spirit of the invention. For example, in an alternative embodiment, main workload VM 900 does not transmit a request for confirmation to replay analysis simulator 925 as in step 920; instead, main workload VM 900 blocks and waits for a communication of such confirmation from replay analysis simulator 925 which transmits such confirmations every time it generates a corresponding data output.

In FIG. 9B, main workload VM 945 does not block its execution when it has data to output. Instead, after main workload VM 945 generates data outputs (step 950) and the VMM intercepts such data output (step 955), the VMM places the data outputs in a queue for release (step 960) but continues execution of main workload VM's 945 instruction stream. In the embodiment of FIG. 9B, replay analysis simulator 975 periodically transmits to main workload VM 945 the current timing of its instruction stream (and confirmation that is has conducted its program analysis up to that point) (step 980). When main workload VM 945 receives such timing information (step 965), it releases those data outputs in the queue that occurred up to that same time in main workload VM's 945 instruction stream (step 970).

In certain embodiments implementing synchronization between a primary workload VM and an analysis platform (i.e., simulator or VM), the primary VM does not block the release of output until the analysis platform's instruction stream reaches the same output release point (as in FIGS. 9A and 9B). For certain types of analysis, the characteristics that are being analyzed on the analysis platform can be guaranteed in a discrete step prior to the occurrence of data outputs. For example, in one embodiment, the analysis platform performs a virus scan of all executables prior to their execution. In such an embodiment, the outputs of the primary workload VM are released as soon as the analysis platform completes the last applicable virus scan. Rather than waiting for the analysis platform to reach the data output point in its instruction stream, the primary workload VM waits until completion of the virus scan, which can occur prior to any related data output points.

Alternative embodiments may further enhance the synchronization between the main workload VM and analysis platform by limiting how far the main workload VM is allowed to run ahead of the analysis platform. For example, the analysis platform may transmit its current time in the replay of the main workload's instruction stream such that the main workload VM is able to verify that its own timing in the instruction stream is no greater than a predetermined time interval after the current time of the analysis platform. If the main workload VM is too far ahead, it may block until its timing falls within the predetermined time interval. Limiting the lag between the main workload VM and analysis platform limits the amount of time that the main workload's outputs are deferred, which in turn limits the amount of timing perturbation the main workload may observe (e.g., when it measures the round-trip time of a network).

F. Improving Performance of Analysis System

Because an analysis VM executes the same instructions as the primary workload VM in addition to performing the work of analysis, the analysis VM can become a bottleneck and slow down execution of the primary VM, for example, when running in a synchronous fashion as discussed in Section E. Optimizations may be made to the analysis platform to improve its execution performance. One such optimization, according to an embodiment of the invention, is based upon an observation that during replay on an analysis VM, interrupt delivery is or can be made immediate. For example, in x86 operating systems, the hit instruction is used to wait for interrupts; this saves power compared to idle spinning. One hit invocation waiting for a 10 ms timer interrupt can consume equal time to tens of millions of instructions on modern 1+GHz processors. During analysis, hit time passes instantaneously. As an example, the primary workload VM may be a typical interactive desktop workload with a user surfing the web. Idle times during which the user may be reading on the web or where human reaction times on the desktop are slow (e.g., opening applications, selecting menus, etc.) enable the execution of the analysis VM to catch up to the primary workload VM. As such, idle time can be deliberately increased in many run-time environments to assist the analysis VM in keeping up with the main workload VM. For example, idle time can be increased in server farms by adding more servers and balancing load across them.

Additionally, device I/O can be accelerated during replay. For example, in one embodiment, network writes need not be sent and network data is recorded in the replay log (similar to a heterogeneous system) such that network reads can use the network data from the replay log. This frees the analysis VM from waiting for network round-trip times, because disk throughput (to access the log) is often greater than end-to-end network throughput. Disk reads can similarly be satisfied from the replay log rather than the emulated hard disk of the analysis VM, and this can accelerate the analysis VM because the replay log is always read sequentially. This optimization can also free the analysis VM from executing disk writes during replay, which frees up physical disk bandwidth and allows completion interrupts to be delivered as soon as the instruction stream arrives at an appropriate spot to receive them. Disk reads done by the primary VM may also prefetch data and thereby accelerate subsequent reads by the analysis VM. In one exemplary embodiment, device I/O is further accelerated through the use of a shared cache of disk blocks when a primary workload VM and analysis VM are run on the same hardware platform. In this embodiment, when the primary workload VM executes, device I/O data and/or other log information is stored in the shared cache so that the analysis VM can access such data during replay rather than repeating the same device I/O.

Figure 10A:
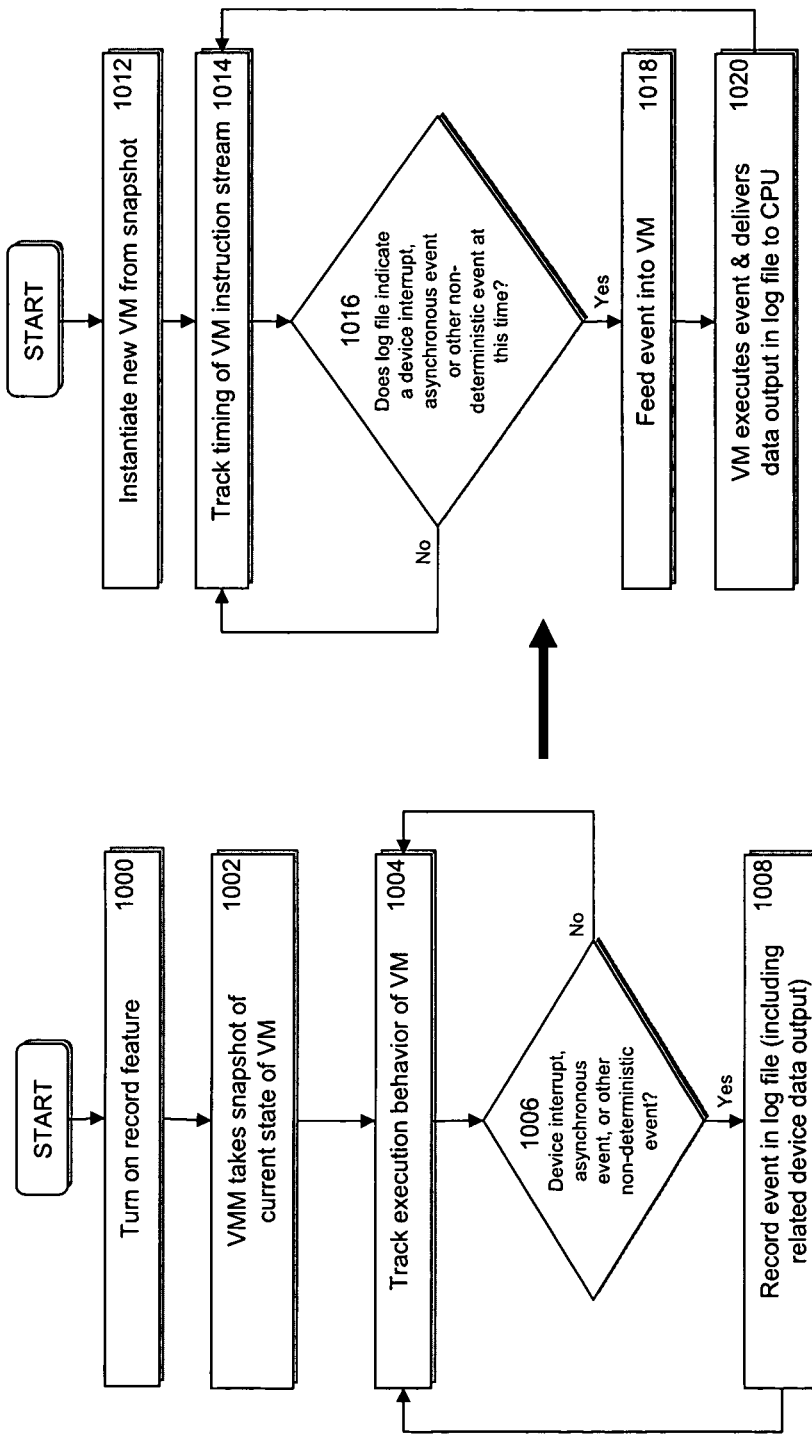
FIG. 10A is a flow chart of an embodiment of a method for accelerating replay on an analysis platform.

FIG. 10A depicts a flowchart of an embodiment of a method for accelerating replay in a homogeneous environment. First, the VMM of recording VM 1024 enables the record feature (step 1000), takes a snapshot of the VM state (step 1002), and begins tracking system behavior as recording VM 1024 executes (step 1004). When non-deterministic events such as device interrupts or other asynchronous events occur (step 1006), information relating to such events are recorded in a log file (step 1008). Such information includes the timing of the occurrence and device data outputs to the CPU (e.g., disk reads, network reads, etc.) so that analysis VM 1026 can consume the data directly from the log and avoid waiting for device I/O round trip times during replay. The flow then returns to step 1004.

Analysis VM 1026 is instantiated based upon information in the snapshot taken in step 1002 (step 1012) and tracks the timing of the execution of its instruction stream in step 1014. If the log file recorded by recording VM 1024 indicates the occurrence of a non-deterministic event (step 1016), analysis VM 1026 feeds the non-deterministic event into its instruction stream at the same point in time that it occurred during the original execution of the recording VM 1024 (step 1018). Analysis VM 1026 executes the event and delivers any related device data output in the log file to its virtual processor, thereby avoiding any device I/O round trip times during replay (step 1020). Because the log file is read contiguously by analysis VM 1026, replay is accelerated in comparison to a slower random-access style disk I/O event that would have occurred had data been delivered to analysis VM's 1026 emulated hard disk to perform the device I/O (as in step 320 of FIG. 3). The flow then returns to step 1014.

In another embodiment, operations that are executed during record are not replayed. One such example of this is exception checking. For example, x86 systems often check for exceptional conditions. Although these checks rarely raise exceptions, executing them adds overhead to an embodiment's emulated CPU. For example, with segment limit checks, every memory reference or instruction fetch must be checked that it is within bounds for an appropriate segment. Most accesses do not raise exceptions and interrupts are utilized to replay any exceptions that do occur. Decoupled analysis enables one to reduce the overhead of exception checking on an analysis simulator by leveraging the exception checking that has already occurred on the main workload VM. During logging, the time and location in the instruction stream of any exceptions are recorded, and these exceptions are delivered during replay just like other asynchronous replay events. This strategy frees the analysis simulator from the overhead of explicitly checking for exceptions during replay. Skipping these checks on the analysis simulator makes the CPU simulator faster and less complex, while still guaranteeing proper replay of a workload that contains violations of any checks (as reflected by the exceptions recorded in the log file). It should be recognized that many checks can be similarly skipped in embodiments of the invention, including debug exceptions, control transfer checks for segment changes, the alignment check (which when enabled, ensures all memory accesses are performed through pointers aligned to appropriate boundaries) and others.

Figure 10B:
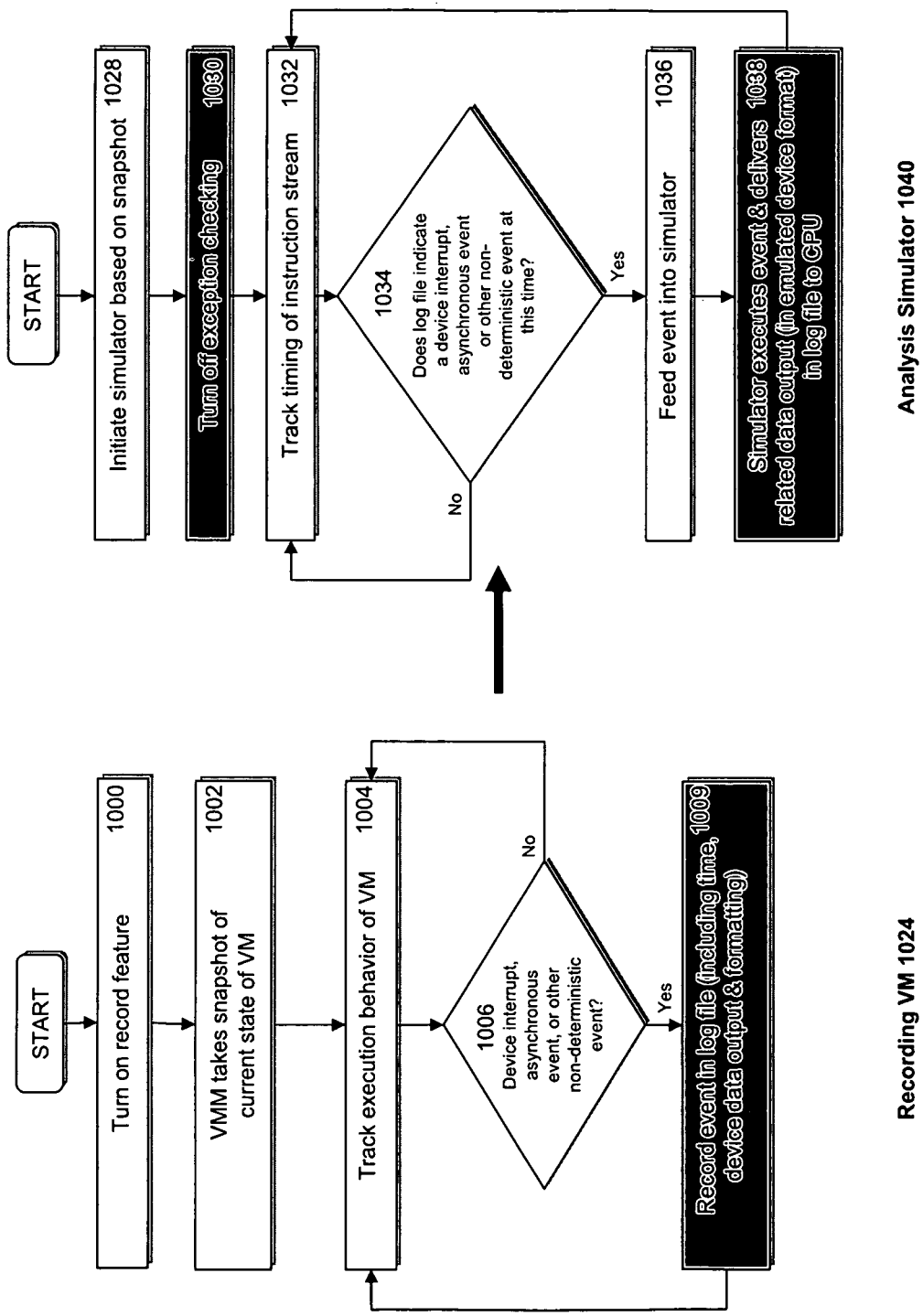
FIG. 10B is a flow chart of an embodiment of another method for accelerating replay on an analysis platform.

FIG. 10B depicts a flowchart of an embodiment of a method for accelerating replay on a heterogeneous system where analysis simulator 1040 skips exception checking that has already been performed by recording VM 1024. Recording VM 1024 takes the same initial steps 1000 to 1004 as the embodiment of FIG. 10A. When non-deterministic events such as device interrupts or other asynchronous events occur (step 1006), information relating to such events are recorded in a log file (step 1009, which is similar to step 508 in heterogeneous environments). Such events include exceptions that are generated pursuant to exception checking, because exceptions are non-deterministic events. The flow then returns to step 1004.

Analysis simulator 1040 is instantiated based upon information in the snapshot taken in step 1002 (step 1028), turns off exception checking (step 1030), and tracks the timing of the execution of its instruction stream in step 1032. By turning off exception checking, analysis simulator 1040 is able to utilize computing resources that would have been allocated for exception checking to accelerate execution. If the log file recorded by recording VM 1024 indicates the occurrence of a non-deterministic event (step 134), analysis simulator 1040 feeds the non-deterministic event into its instruction stream at the same point in time when it occurred during the original execution of the recording VM 1024 (step 1036). As noted previously, exceptions are non-deterministic events and would be recorded in the log file. In step 1038, analysis simulator 1040 executes events (including exceptions) and delivers external input data recorded in the log file such as key presses, mouse movements and network data to the appropriate emulated devices (e.g., keyboard, mouse, network card, etc.) to be deterministically replayed by such devices or timely inserting interrupts into the CPU instruction stream to retrieve outputs deterministically made available by emulated devices (e.g., hard drive data output responses after CPU read requests). The flow then returns to step 1032.

It should be recognized that various optimization techniques such as those discussed in this Section F can be combined into a single embodiment of the invention which may utilize either a VM or CPU simulator for analysis, depending upon the techniques selected.

The invention has been described above with reference to specific embodiments. Persons skilled in the art, however, will understand that various modifications and changes may be made thereto without departing from the broader spirit and scope of the invention as set forth in the appended claims. The foregoing description and drawings are, accordingly, to be regarded in an illustrative rather than a restrictive sense. For example, while the foregoing discussions have generally discussed recording and replay VMs having the same emulated devices, it should be recognized that many of the teachings herein can also be performed at the hardware level, so long as the recording and replay VMs have the same physical hardware devices as well. Similarly, the foregoing discussions have discussed timing of the instruction stream in a general sense. It should be recognized that such timing may be measured at the instruction level (i.e., the $n^{th}$ instruction in the instruction stream) but that other measurements of time may be implemented in certain embodiments, for example, clock cycles, assuming certain guarantees of timing in the hardware platform.

The various embodiments described herein may employ various computer-implemented operations involving data stored in computer systems. For example, these operations may require physical manipulation of physical quantities usually, though not necessarily, these quantities may take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs) CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

In addition, while described virtualization methods have generally assumed that virtual machines present interfaces consistent with a particular hardware system, persons of ordinary skill in the art will recognize that the methods described may be used in conjunction with virtualizations that do not correspond directly to any particular hardware system. Virtualization systems in accordance with the various embodiments, implemented as hosted embodiments, non-hosted embodiments, or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

We claim:

1. A method for analyzing a computer program running on a first virtual machine, the method comprising:
    running the computer program on the first virtual machine and recording a log comprising non-deterministic events in the instruction stream of the first virtual machine during the running of the computer program, the log further comprising read data that is output during the running of the computer program from a first emulated device of the first virtual machine to a first virtual processor of the first virtual machine, the read data corresponding to read requests from the first virtual processor to the first emulated device;
    initiating a replay platform having a second virtual processor;
    accessing the log comprising non-deterministic events in the instruction stream of the first virtual machine and the read data corresponding to read requests from the first virtual processor of the first virtual machine to the first emulated device of the first virtual machine;
    replaying the instruction stream of the first virtual machine on the replay platform using the log, and providing the read data to the second virtual processor of the replay platform during the replaying of the instruction stream of the first virtual machine; and
    executing program analysis code on the replay platform during the replay.

2. The method of claim 1, wherein the replay platform is a second virtual machine.

3. The method of claim 2, wherein read requests from the second virtual processor of the second virtual machine are executed by reading corresponding read data from the log.

4. The method of claim 1, further comprising:
    blocking transmission of write data corresponding to a write request from the second virtual processor of the replay platform to an emulated storage device of the replay platform.

5. The method of claim 2, wherein the log comprises an interrupt that is generated after time, t, has elapsed since a last instruction in the instruction stream, and wherein during replay on the second virtual machine, the same interrupt is generated immediately after the last instruction in the instruction stream.

6. The method of claim 1, wherein the replay platform is a processor simulator.

7. The method of claim 6, further comprising disabling exception checks in the processor simulator.

8. The method of claim 7, wherein the log comprises an exception that is generated after time, t, has elapsed after performing an exception check, and wherein during replay on the processor simulator, the exception check is not performed and the same exception is generated at a point in the instruction stream where the exception check was performed when running the computer program on the first virtual machine.

9. The method of claim 7, wherein the exception checks comprise memory reference checks.

10. The method of claim 2, wherein the second virtual machine is instantiated on the same hardware platform as the first virtual machine and shares a memory cache with the first virtual machine, wherein the memory cache comprises the log.

11. A method for analyzing a computer program running on a first virtual machine, the method comprising:
    running the computer program on the first virtual machine with a first exception check executing and recording a log comprising non-deterministic events in the instruction stream of the first virtual machine during the running of the computer program with the first exception check executing, wherein if an exception occurs resulting from the first exception check during the running of the computer program, the exception is recorded in the log;
    initiating a processor simulator;
    disabling the first exception check in the processor simulator;
    accessing the log comprising non-deterministic events in the instruction stream of the first virtual machine;
    while the first exception check is disabled in the processor simulator, replaying the instruction stream of the first virtual machine on the processor simulator using the log that was recorded while the first exception check was executing, including replaying the exception recorded in the log if the exception occurred during the running of the computer program on the first virtual machine; and
    executing program analysis code on the processor simulator during the replay.

12. The method of claim 11, wherein the log comprises a second exception that is generated after time, t, has elapsed after performing a second exception check, and wherein during replay on the processor simulator, the second exception check is not performed and the second exception is generated at a point in the instruction stream where the second exception check was performed when running the computer program on the first virtual machine.

13. The method of claim 11, wherein the first exception check comprises a memory reference check.

14. The method of claim 11, wherein the log comprises an interrupt that is generated after time, t, has elapsed since a last instruction in the instruction stream, and wherein during replay on the processor simulator, the same interrupt is generated immediately after the last instruction in the instruction stream.

15. A computer system for providing decoupled dynamic program analysis, the computer system comprising:

a first platform comprising a first processor programmed to execute a virtual machine software layer to (a) instantiate a first virtual machine, (b) generate a first log comprising non-deterministic events in the first virtual machine's instruction stream, and (c) generate a second log comprising read data that is output from a first emulated device of the first virtual machine to a first virtual processor of the first virtual machine, the read data corresponding to read requests by the first virtual processor of the first virtual machine to the first emulated device of the first virtual machine; and a second platform comprising a second processor programmed to (a) initiate a replay platform having a second virtual processor, (b) replay the instruction stream of the first virtual machine using the first log and the second log, including providing the read data to the second virtual processor of the replay platform during the replaying of the instruction stream of the first virtual machine, and (c) execute program analysis code during the replay.

16. The computer system of claim 15, wherein the replay platform is a second virtual machine.

17. The computer system of claim 16, wherein the second processor of the second platform is further programmed to execute read requests from the second virtual processor of the second virtual machine by reading corresponding read data from the second log.

18. The computer system of claim 15, wherein the second processor of the second platform is further programmed to block transmission of write data corresponding to a write request from the second virtual processor of the replay platform to an emulated storage device of the replay platform.

19. The computer system of claim 15, wherein the replay platform is a processor simulator.

20. The computer system of claim 16, wherein the second processor of the second platform is further programmed to disable exception checks in the second virtual machine.

* * * * *